Feb. 9, 1960 D. MACPHEE 2,924,283
MACHINES FOR PULLING COTTON PLANTS AND
THE LIKE OUT OF THE GROUND
Filed Jan. 15, 1957 2 Sheets-Sheet 1

FIG. I.

INVENTOR
DONALD MACPHEE
BY
Holcombe, Wetherill & Brisebois
ATTORNEYS

Feb. 9, 1960 D. MACPHEE 2,924,283
MACHINES FOR PULLING COTTON PLANTS AND
THE LIKE OUT OF THE GROUND
Filed Jan. 15, 1957 2 Sheets-Sheet 2

INVENTOR
DONALD MACPHEE

ATTORNEYS

United States Patent Office 2,924,283
Patented Feb. 9, 1960

2,924,283

MACHINES FOR PULLING COTTON PLANTS AND THE LIKE OUT OF THE GROUND

Donald Macphee, Barakat, Sudan, assignor to The Sudan Gezira Board, Barakat, Sudan, a corporation of Sudan, and Robert Boby Limited, Bury St. Edmunds, England, a company of Great Britain Application January 15, 1957, Serial No. 634,292

4 Claims. (Cl. 171—58)

This invention relates to machines for pulling cotton plants and the like out of the ground. For convenience the invention will be described in relation to cotton plants, although it will be appreciated that it can be used for other plants of similar form.

In many agricultural areas it is required by law, or as a matter of sound agricultural sense, to pull out of the ground all cotton plant remains which are left after the cotton has been picked. Generally the cotton plants are pulled from the ground by hand tools, piled and burnt for disease control. This is a slow, laborious and generally unpleasant operation.

Machines have been devised for the purpose of pulling flax, sugar beets and the like, comprising two endless moving belts which are pressed together and which are inclined with respect to ground level so that as the machine advances the plants are caught between the belts at a low level and are pulled upwardly as the belts rise. Such machines, however, are unsuitable for pulling cotton plants because these plants require a stronger pull to dislodge them than do the other plants mentioned. For instance, it may require a pull of from 250 lbs. to 400 lbs. to pull a single large cotton plant out of hard dry soil. If a known pulling machine designed for other crops is used for cotton plants, rapid wear on the belts is experienced or the machine may even fail to pull the cotton plants at all. Such failure may cause jamming of the machine, the unpulled plants will remain in the ground, and the wear on the belts will be even more rapid.

According to the present invention a machine for pulling cotton plants and the like out of the ground comprises a pair of endless moving belts lengths of which are pressed together and inclined in relation to the ground so that they rise in the direction from front to rear of the machine, and a pair of driven pneumatic tired wheels which roll against each other in the vicinity of the nip of the belts, these wheels being inclined at approximately the same angle as the belts, for imparting a strong initial upward pull to the plants.

The tires of the wheels present a relatively large area for pulling purposes and they can apply a stronger pull to the plants than can be applied by the belts. Once the strong initial pull has been applied to the plants to loosen them the belts can easily complete the operation by pulling the plants right out of the ground.

The material of pneumatic tires is highly resistant to wear, and it has been found that tires are much more wear-resistant than belts under the conditions in which the machines are operated.

Preferably, the machine is mounted on a self-propelled steerable chassis, the propulsion power unit of which also provides the drives for the belts and for the said pneumatic-tired wheels. The chassis may also carry a receptacle for the pulled plants disposed beneath the discharge end of the belt path.

For use where the cotton plants have been planted in regularly-spaced rows, the machine may have at least two sets of pneumatic-tired wheels and belts disposed side by side at a distance apart equal to the spacing of the rows, so that the machine can pull plants from at least two rows simultaneously.

The invention may be performed in various ways and one particular form of machine embodying the invention will now be described by way of example with reference to the accompanying somewhat diagrammatic drawings, in which.

Figure 1:
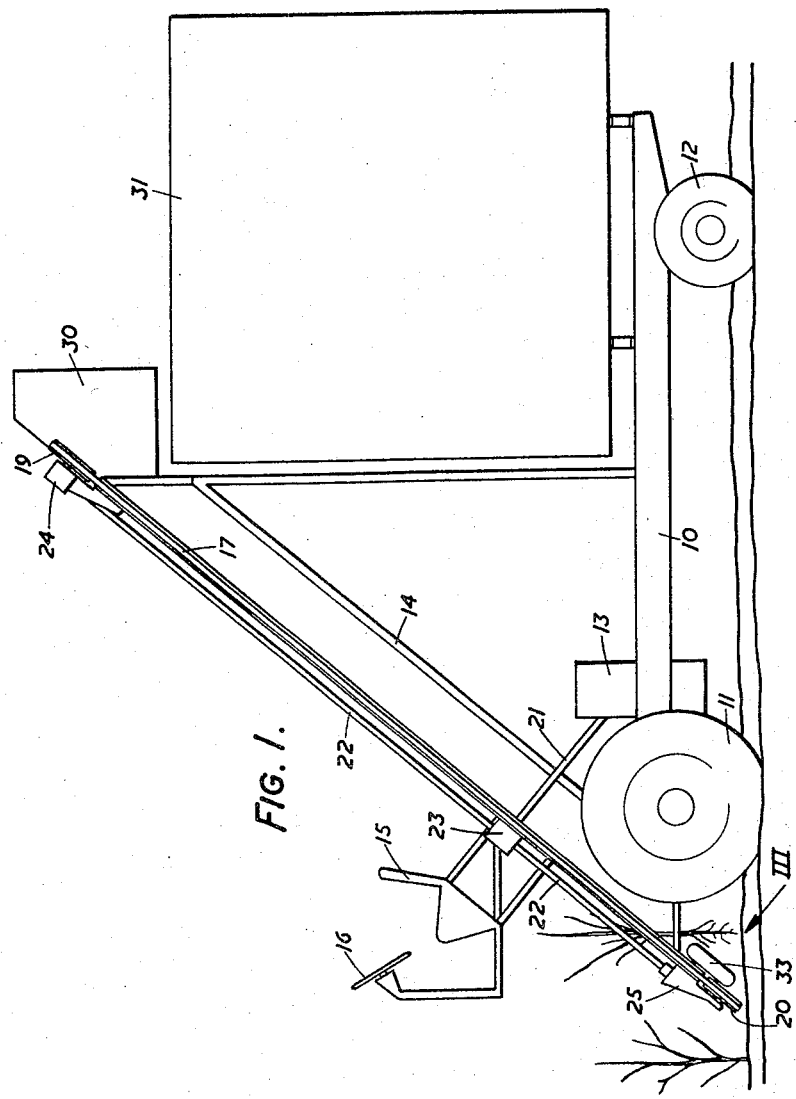
Figure 1 is a side view of the machine.
Figure 2:
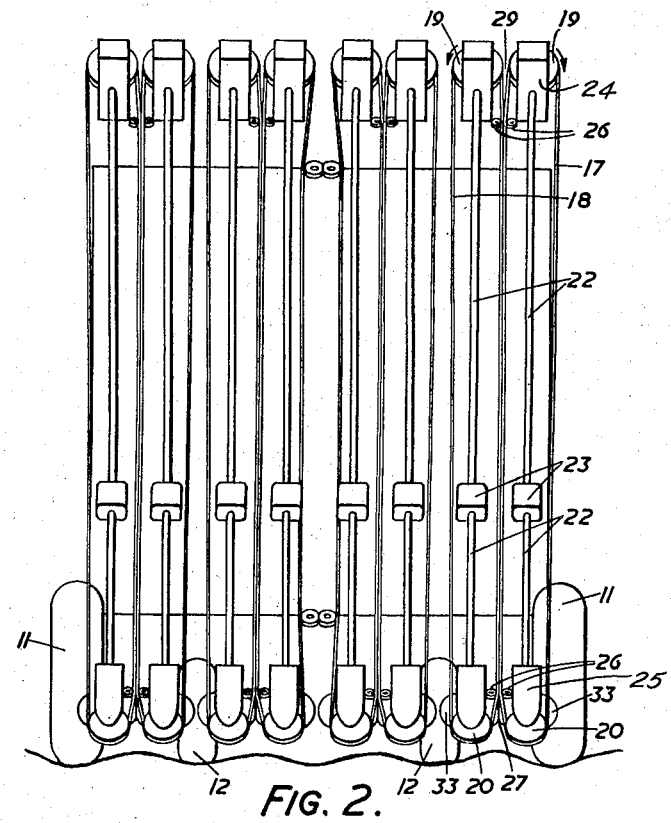
Figure 2 is a front view of the machine with the driving seat and controls removed.

The machine shown in the drawings comprises a self-propelled chassis 10 mounted on a pair of front wheels 11 and a pair of rear wheels 12. One or both pairs of wheels are driven by an engine 13 through a conventional power transmission system, and one or both pairs are steerable.

Mounted on the chassis 10 is a framework 14 which at the front supports a driver's seat 15, a steering wheel 16 connected by a linkage (not shown) to the steerable wheels and other conventional controls.

Also mounted on the framework 14 so that they slope steeply upwards from front to rear are four sets of belts, which sets are spaced apart across the front of the machine at intervals equal to the distance between the rows of cotton plants that are to be pulled. Each set of belts comprises two endless belts 17 and 18 each of which runs over an upper driving pulley 19 and a lower driving pulley 20. The driving pulleys are driven by the engine 13 through individual transmission shafts 21 and 22, the drive from each shaft 21 to each shaft 22 being effected through right angle gearing contained in a casing 23. The shafts 22 drive the pulleys 19 and 20 through right angle gearing contained in casings 24 and 25 respectively. Between the pulleys 19 and 20 the upwardly-running lengths of the two belts 17 and 18 are pressed together by idler pulleys 26. The pulleys 20 are spaced apart to provide a convergent gap 27 leading to the nip of the belts 28 between the lowest pair of idler pulleys 26. Similarly, the upper pulleys 19 are spaced apart to provide a divergent gap 29 above the uppermost pair of idler pulleys 26. The gap 29 is disposed above a hopper or chute 30, the underside of which opens over a container 31 mounted on the chassis 10.

Figure 3:
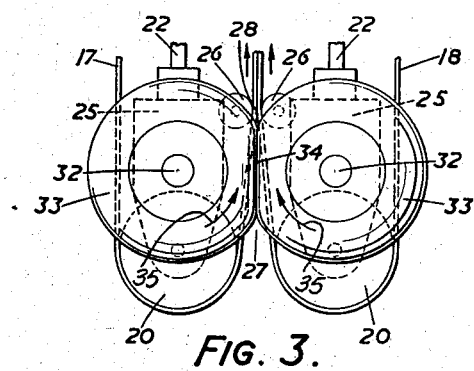
Figure 3 is an enlarged view of the bottom end of one set of belts and rubber-tired wheels viewed in the direction of the arrow III in Figure 1.

Referring to Figure 3, the stub shafts 32 project from the undersides of the casings 25 and are connected through gearing with the shafts 22. Mounted on the stub shafts are two rubber-tired wheels 33, the tires of which are pressed together to form flat contact areas 34. As best seen in Figure 1, the wheels 33 are inclined at the same angle as the belts 17 and 18.

The position of the wheels 33 in relation to the belts may be adjustable so that they can be set into the most suitable relationship for the particular size and shape of the cotton plants that are to be pulled. Moreover, the heights both of the wheels 33 and of the lower ends of the belts 17 and 18 may be made adjustable in relation to ground level. The purpose of this adjustment is to enable the machine to be adjusted to suit a wide range of pulling conditions, and to permit the lower ends of the belts and the wheels 33 to be raised sufficiently to enable the machine to travel by road without risk of these parts touching the ground.

The machine works as follows. It is driven along the ground with the convergent gaps 27 at the lower ends of the belt paths in line with the rows of cotton plants that are to be pulled. As the machine advances, so the pulleys 19 and 20, the belts 17 and 18, and the wheels 33 are driven in the directions indicated by the arrows 35. The machine is driven at a forward speed that is as nearly as possible equal to the horizontal component of the speed of the upwardly moving lengths of the belts. This can be achieved by suitable choice of the gear ratios in the power transmissions from the engine 13 to the belt pulleys 19 and 20 and to the wheels 11 and/or 12 respectively. The cotton plants are guided by the pulleys 20 towards the rubber-tired wheels 33 and, as the plants enter between the contact areas 34 of these wheels, they are firmly gripped between the wheels. Owing to the inclination of the wheels and the consequent upwardly sloping movement of the contacting areas 34, a strong upward pull is imparted to the cotton plants, to lift them slightly and to loosen them in the ground. As the plants reach the end of the contact areas 34 between the wheels 33 they enter the nip 28 between the belts 17 and 18 and are thereby steadily drawn out of the ground and raised between the upwardly moving lengths of the belts as shown in Figure 1. When the plants reach the divergent gap 29 at the top of the belt path they are released and fall into the chute 30 which directs them into the receptacle 31.

It will be appreciated that numerous modifications may be made to the machine described without departing from the invention. For work on large fields, the width of the machine and the number of sets of belts and rubber-tired wheels provided could be extended.

What I claim as my invention and desire to secure by Letters Patent is:

1. A machine for pulling cotton and like plants out of the ground comprising a frame, means attached to and supporting said frame for propulsion over the ground, at least one pair of pneumatic-tired plant-pulling wheels, mounting means attached to said frame and supporting said wheels with their planes of rotation inclined upwardly from front to rear of said machine and with parts of the peripheries of said wheels pressed against each other to form an upwardly inclined contact zone, means operatively connected to said wheels for driving them in opposite directions whereby as said machine is propelled over the ground said wheels grip said plants between them at said contact zone and impart a strong upward pull to said plants, at least one pair of endless belts carried by pulley means mounted on said frame and disposed above said pulling wheels, said belts being inclined upwardly from front to rear of said machine and driven by said pulley means in opposite directions, means pressing together the upwardly-moving lengths of the belts of said pair adjacent the lowest part of their paths above said contact zone whereby said belts receive said pulled plants between them and raise said pulled plants to a substantial height above the ground.

2. A machine according to claim 1 in which the means for supporting the frame for propulsion over the ground comprises wheels supporting said frame, said machine comprising also means for steering at least some of these wheels, a power unit, a power transmission system connecting said power unit to said wheels, and a further power transmission system connecting said power unit to said belts and said plant-pulling wheels.

3. A machine according to claim 2 in which said frame carries a receptacle for the pulled plants disposed beneath the highest part of the paths of said belts.

4. A machine according to claim 1 in which there are at least two sets of belts and at least two sets of plant-pulling wheels disposed side by side and mounted on said frame whereby said machine is adapted to pull plants from at least two parallel rows simultaneously.

References Cited in the file of this patent
UNITED STATES PATENTS

| | | |
|---|---|---|
| 62,090 | Tyler | Feb. 12, 1867 |
| 1,509,799 | Vessot et al. | Sept. 23, 1924 |
| 2,291,784 | Balazs et al. | Aug. 4, 1942 |
| 2,660,013 | Priestley | Nov. 24, 1953 |